No. 808,321. PATENTED DEC. 26, 1905.
T. L. VALERIUS.
APPARATUS FOR RIPENING CREAM.
APPLICATION FILED SEPT. 13, 1904.
3 SHEETS—SHEET 2.
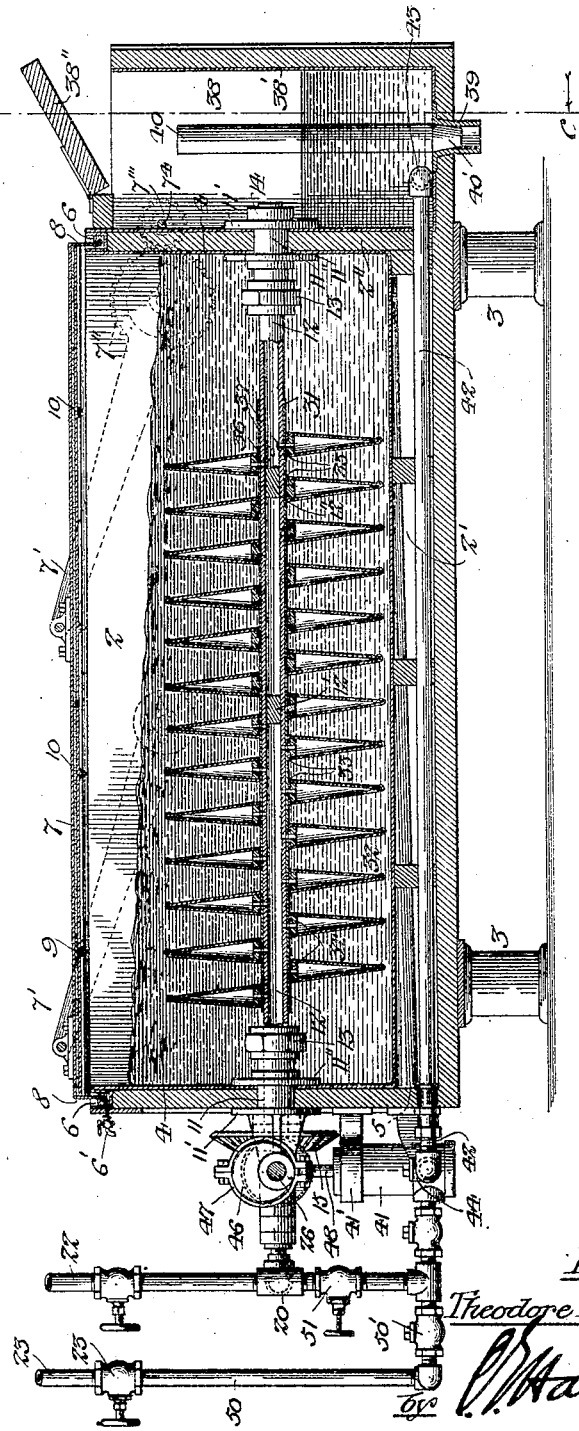

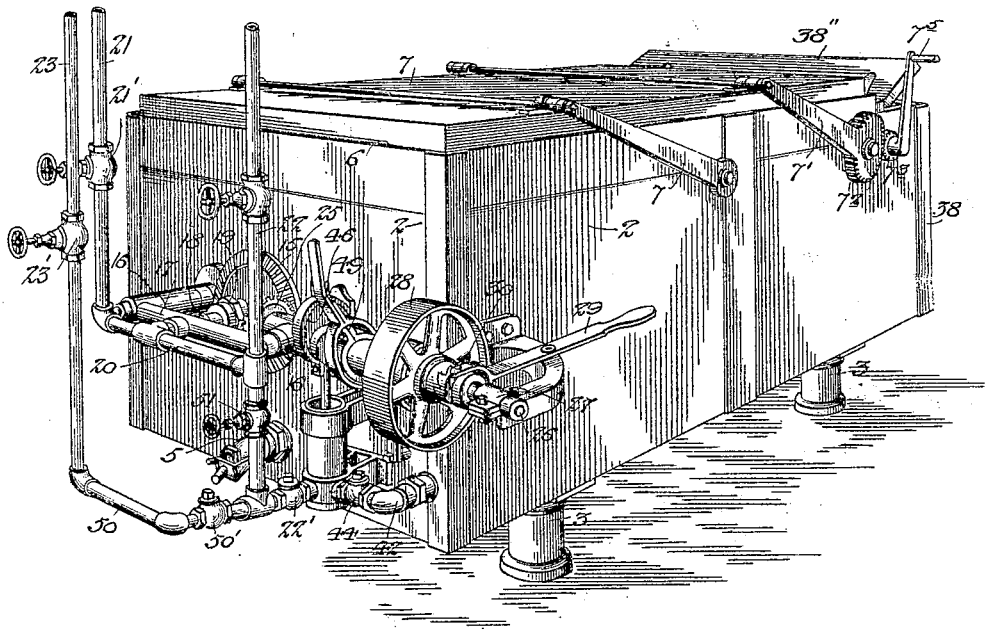

No. 808,321. PATENTED DEC. 26, 1905.
T. L. VALERIUS.
APPARATUS FOR RIPENING CREAM.
APPLICATION FILED SEPT. 13, 1904.
3 SHEETS—SHEET 3.
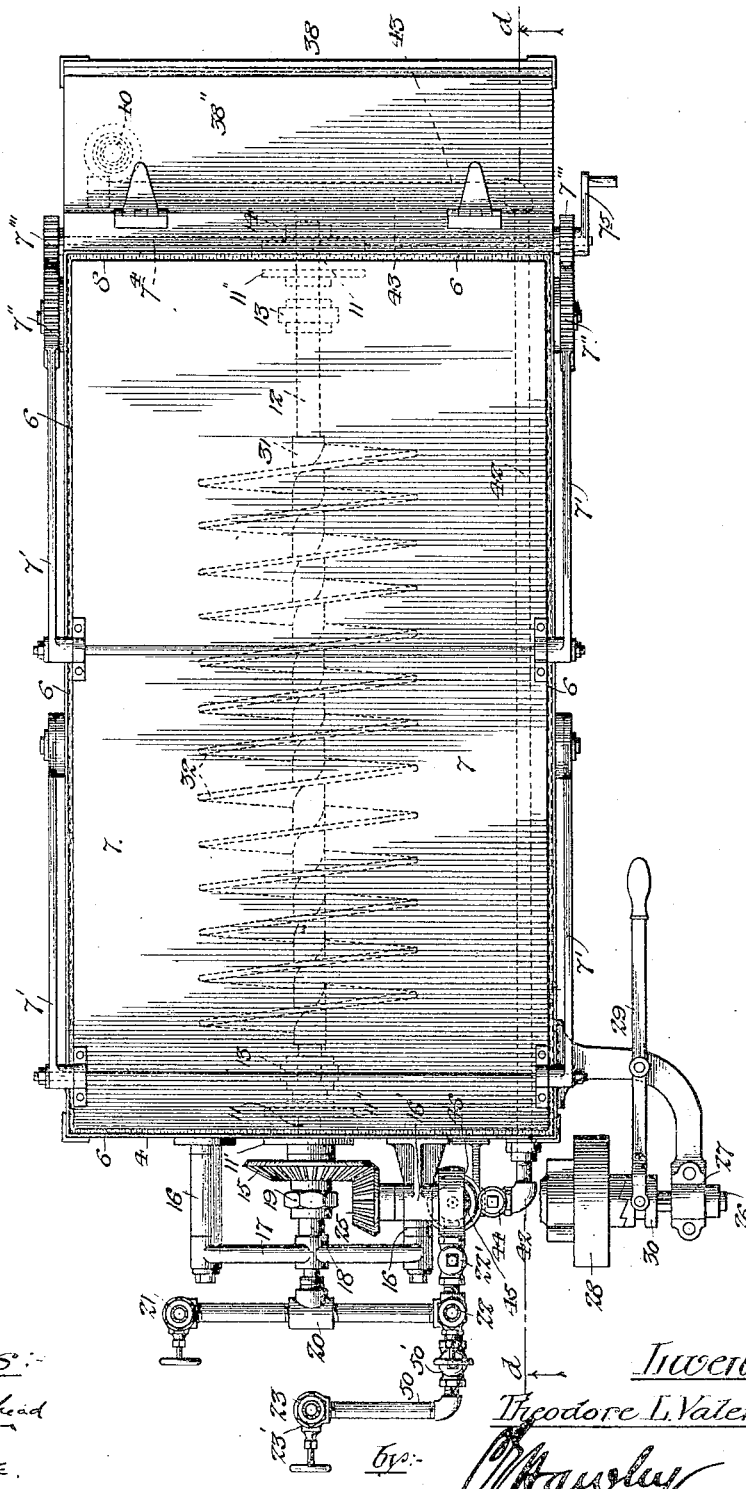

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

APPARATUS FOR RIPENING CREAM.

No. 808,321.     Specification of Letters Patent.     Patented Dec. 26, 1905.

Application filed September 13, 1904. Serial No. 224,327.

*To all whom it may concern:*

Be it known that I, THEODORE L. VALERIUS, of Fort Atkinson, Jefferson county, Wisconsin, have invented a certain new, useful, and Improved Apparatus for Ripening Cream, of which the following is a specification.

My invention relates to apparatus for employment in the art of butter-making, and has particular reference to cream-ripeners for creameries where large quantities of butter are produced.

The object of my invention is to provide a cream-ripener which shall be simple and economical both in construction and operation and which when placed in operation will automatically reduce a body of cream to a condition of uniform consistency or texture and also successfully and effectively control and govern the temperature of the body of cream under treatment.

My invention consists in the hereinafter-described cream-ripener, which is capable of handling the largest quantities of cream and, furthermore, cream of all kinds and conditions, the ripener operating to reduce the cream to a condition of uniform consistency, to thoroughly emulsify the mass and disseminate the starter therein, to aerate—*i. e.*, expose to the atmosphere—all parts of the mass of cream, to impart any desired temperature to the mass as a whole, to maintain the condition or state of uniformity throughout the period of fermentation and at all temperatures, and also operating to refrigerate the ripened cream, all without impeding the ripening process and without churning the cream and at very little expense.

My invention may be more specifically defined as a cream-ripener which comprises a vat or receptacle in combination with a stirring device arranged in said vat and adapted to drive or circulate the cream from end to end of the vat and to set up vigorous agitation and conflicting currents; and, further, my invention consists in a ripener which has a stirring or circulating device that operates to mechanically smooth or break up the clots and leathery portions contained in the body of cream; and, further, my invention includes means for increasing, decreasing, or holding the temperature of the body of cream while in the described state of agitation and during the fermentation period; and particularly my invention consists in a cream-ripener comprising a vat in combination with a long rotary spiral arranged in said vat and through which a tempering fluid is passed to effect the heating or cooling of the body of cream in the vat, said spiral being of much less diameter than the width of said vat to leave large return-flow spaces around the spiral and said spiral being rotated with sufficient speed to forcibly agitate the contents of the vat and cause the rapid longitudinal flow thereof in the vat; and, further, my invention consists in a cream-ripener characterized as above and which is self-contained to the extent of being provided with means for circulating the tempering liquid through the rotary tempering device; and, further, my invention consists in various details of construction and in combinations of parts, all as hereinafter described, and particularly pointed out in the claims.

My invention will be more readily understood by reference to the accompanying drawings, forming a part of this specification, and in which—

Figure 1 is a perspective view of a cream-ripener embodying my invention. Fig. 2 is a transverse vertical section on the line *c c* of Fig. 3. Fig. 3 is a vertical longitudinal section of my novel cream-ripener on the line *d d* of Fig. 4, and Fig. 4 is a plan view of the cream-ripener.

My cream-ripener may be made and is successful in all sizes; but the drawings are intended to illustrate a ripener of several tons capacity, this particular vat being about ten feet long, five and a half feet wide, and four and a half feet deep and a rotary member that is several feet in diameter and nearly as long as the vat. Said rotary member has a hollow shaft held in the ends of the vat and preferably always partakes of the form of a spiral that is continuous from end to end. Respecting the cost and efficiency of the ripener, I have secured the best results with such a spiral device; but the rotary member may be made in other forms without departing from my invention. The said spiral is hollow and is through a hollow shaft supplied with tempering fluid from several sources, one thereof being a tank at the end of the vat, the circulating means being a pump, also on the vat and driven with said spiral. When rotated, the spiral causes the contents of the vat to circulate from end to end of the vat and also causes the same to boil vigorously, many conflicting currents being set up by the rotation of the spiral within the confining-walls. The spiral has no tendency to agitate the cream to the extent of lifting, beating, or dashing the same about, and for this reason may be operated at high speed without endangering the cream. I am careful to make the rotary member of much less width and depth than the vat, and in this way provide ample spaces at the sides of and beneath said member, through which the cream that is propelled toward one end of the vat may return to the opposite end, eddying and boiling as it goes, but free from any compression or restraint that would tend to churn it. It is obvious that the temperature of the mass of cream thus set in motion may be quickly influenced and equalized through the medium of the rotary member, and I prefer to make the same hollow to serve as a channel for the tempering fluid, as described. Nevertheless by this statement I do not intend to confine my invention to a hollow spiral, as it is possible to simultaneously agitate, smooth, and temper the mass of cream by separate instead of identical means.

A brief statement of the functions performed and the results accomplished by the machine thus described will facilitate the description and understanding of its details.

The cream from the separators or on its arrival at the creamery is poured or dumped into the ripener. The spiral is started and kept in rotation from the time when there is enough cream in the bottom of the vat to partly immerse the spiral. In other words, I have found it desirable to prevent the localizing of temperatures or of fermentation and to start the blending and equalization of the different lots of cream from the very beginning at the reception of the cream. During this period it is not only advantageous to equalize the temperature and begin the aeration of the cream, but to also reduce the temperature of the cream to a point where its further fermentation will be practically stopped until the whole supply of cream has been received. This reduction of temperature is brought about by passing cold water or brine through the spiral. These operations are continued until the vat has been filled with cream, and as this occupies a considerable period the whole mass or body unless composed of very bad cream is by that time in condition to receive the starter or lactic-acid ferment—that is, the rapid rotation of the cold spiral in the cream and the circulation and boiling action of the cream in the vat will not only have reduced the temperature of the mass, but will have equalized the same in all parts of the vat, will have reduced the component lots of cream to a homogeneous mass of substantially uniform consistency, smoothing out and breaking up the denser portions to prepare the cream for admixture with the starting fluid. A further important result of the early circulation and agitation, which continues during the filling operation, is the effective aeration of the cream, every part thereof being at some time exposed to the atmosphere, which rids the cream of noxious and deleterious oils, vapors, and gases.

A quantity of starting fluid may be placed in the vat before it is filled; but I prefer to withhold the starter until the cream has been made uniform as to temperature and consistency of texture. The required quantity of fluid is then poured into the vat and is quickly admixed with the cream by the action of the rotating spiral. The effect of the spiral's action is such that the actual emulsification of the cream and starter is thus accomplished, the fats being held in a uniform state of suspension, and thus properly exposed to the liberating action of the lactic ferment. When it is thought that the starter has been uniformly distributed in the mass of cream, a warm fluid, such as hot water or water and steam, is admitted to the hollow spiral, and said spiral continuing to rotate and circulate the contents of the vat the said contents are quickly raised to a temperature that is conducive to the rapid development of the starter-bacteria. Hence the fermentation of the mass as a whole. This higher temperature, usually approximating 70° to 80° Fahrenheit, is maintained, and the smoothing and emulsifying process is continued until the cream attains a sufficient degree of acidity or ripeness, at which time it will be found to be a smooth and uniform, though comparatively thick liquid, free from liberated butter particles and, save for its temperature, ready for the churn. Fermentation may be hastened or retarded, as desired, by regulating the temperature of the rotary spiral, and, if desired, the spiral may be stopped for part of the time after the cream has been thoroughly emulsified and tempered. Before the cream is taken from the vat its temperature is reduced to and held for a time at about 50° Fahrenheit to prevent putrefactive fermentation and to equalize and hold the low temperature of the butter fat and serum with a view to avoiding a subsequent rise of temperature in the churn. To thus cool the contents of the vat, it is only necesssary to continue the rotation of the spiral and turn cold water or brine into the same.

It should be understood that the vat is preferably closed or covered at all times except during the time the vat is being filled, but that the contents of the vat are practically exposed to the atmosphere at all times through the employment of a peculiar cover, hereinafter described, which permits the escape of vapors and gases from and the entrance of air into the vat, while excluding insects and atmospheric odors.

Proceeding now to the description of my machine in detail, 2 represents a tank or vat, preferably resting upon foundation-pedestals 3. When made of wood, the vat is provided with a metal lining 4, beneath which is an air-space 2', which serves as an insulator.

5 is the drain connection of the vat, same being normally closed. The upper edge of the vat is provided with a shallow trough 6, preferably formed solidly with the metal lining 4.

7 is a cover, preferably composed of several thicknesses of metal with interposed insulation material, and this cover is provided with a top flange 8, that is adapted to occupy the trough or groove 6 in the top of the vat. The cover rests upon the inner edge 9 of the vat-top, but does not make a tight joint therewith, there being several ribs 10 on the under side of the cover. The groove 6 is filled with water, which, with the flange 8 and the walls of the groove 6, completes a perfect water or liquid seal for the top of the vat. The stand of water is insufficient to prevent the escape of pressure of gases from within the vat, or the entrance of air to relieve a tendency toward a vacuum within the vat. In either case the gas or air will bubble through the water seal without expelling the water from the groove 6. It is obvious that this seal effectually prevents the entrance of deleterious odors from the surrounding atmosphere and also serves to exclude insects from the vat.

6' represents a drain-cock connected with the groove 6 for emptying the same.

For raising or throwing back the cover 7 I employ parallel arms or links 7', having their lower ends journaled on the sides of the vat while the cover is pivotally attached to their upper ends. One pair of these links is provided with gear sections or ends 7", and for operating the same I employ pinion 7''' on the shaft 7⁴ at one end of the vat and whereof 7⁵ is the operating-crank. By turning the crank the cover may be either raised or lowered. The water contained in the groove is more or less polluted when cream is ripened in the vat. Hence it is desirable that the groove be cleaned and the water changed frequently. It will be observed that the groove is wide open at the top, making it easy to clean when the cover is raised.

Each end of the vat is provided with a bearing 11 for the hollow shaft 12 of the circulating, agitating, tempering, or emulsifying device, hereinafter referred to as the "rotary" element. As shown in Fig. 3, each bearing comprises the sleeve or bearing proper, 11, having on its outer end a flange 11', that is bolted to the end of the vat. On the inner end of the bearing is a wide flange 11", which makes a tight joint with the metal lining 4. The inner end of the bearing 11 is threaded to receive the stuffing-box 13, containing suitable packing for making a tight joint between the bearing 11 and the shaft 12. A collar 14 on one end of the shaft and the hub of the bevel-gear 15 on the other end of the shaft together prevent longitudinal movement of the shaft in its bearings. By placing the stuffing-boxes on the inner ends of the bearings oil which is placed in the outer ends of the bearings is excluded from the interior of the vat, and, furthermore, cream which seeks to escape through the stuffing-box tends to lubricate the bearings and expel the oil that might otherwise enter therefrom.

The bevel-gear end of the vat is provided with a light frame to sustain the fluid connections. This frame comprises studs 16 16 and cross-bar 17, containing a holder for the fluid connection 18. Said connection comprises a tube which enters the end of the hollow shaft 12, as shown in Fig. 3. The joint between the tube 18 and the shaft is closed by a stuffing-box 19.

20 is the mixing-tube, to which the tube 18 is connected. To the tube or pipe 20 I attach the brine, water, and steam connections 21 22 23. The brine and steam connections have controlling-valves 21' 23', and the water-pipe connection 22 contains a check-valve 22', described hereinafter, with the water-circulating pump upon the end of the vat.

The shaft 12 may be rotated in any suitable manner; but I prefer to employ the pair of bevel-gears 15 and 25, the latter being arranged on a transverse shaft 26 in bearings 16' and 27.

28 is the drive-belt pulley, slidable on the shaft 26 and movable by means of a convenient lever 29. The connection between the pulley and the shaft 26 is effected by means of a chuck, one part of which is on the pulley and the other, 30, of which is fixed on the shaft 26. The rotary device within the vat may be stopped and started by manipulating lever 29.

The hollow spiral is continuous from end to end and receives fluid at one end of the shaft and discharges it through the other. Because of the tempering-fluid connection that end of the vat is termed the "front" end, and it is toward this end that the cream is propelled by the rotating spiral. I prefer to set the spiral on the shaft nearer the front end of the vat than the rear end thereof, the larger space being provided in said rear end. The purpose of so setting the spiral is to effect the crowding or forcing of the cream most vigorously at the head or front end of the vat and to relieve the cream from all pressure as it flows toward the rear of the vat, to the end that the cream may flow naturally to the receiving end of the spiral. The construction of the spiral 32 is well shown in Figs. 3 and 4.

The shaft 12, which is generally a steel pipe having its ends turned to fit the bearings 11, is sheathed with copper 31. This sheath is soldered to the shaft and is used to facilitate the soldering of the central points between the parts of the spiral or screw and the shaft.

The hollow spiral 32 is formed by a plurality of sheet-metal, preferably copper or tinned, disks, each of which is cut upon a radial line, and the ends thus formed drawn apart form the disk into a spiral. The ends of adjacent disks are joined in series to present an unbroken surface from end to end of the spiral. It will be understood that there are two sets of disks, one set forming the front surface of the spiral 32 and the other the back surface thereof, and on referring to the drawings it will be seen that the edges of the front and back disks are drawn together. I prefer to subject the disks to the action of spiral dies to give the same a permanent set before undertaking to place them upon the shaft 12. If desired, said dies may be formed to also effect the necessary lateral pitch of the disks, and thereby facilitate the joining of the edges of the front and back disks. In such cases it is necessary to employ two sets of stamps or dies, the front and back disks being relatively reversed. The cross-section of the spiral is triangular, and I prefer that the base of each triangular section shall be greater than the distance between the bases of adjacent triangles. Each spiral-forming disk is provided with a central hole to receive the shaft 12 and is also provided with an inwardly-turned flange 33, adapted to fit snugly around the copper sheath of the shaft. The flange-opening in the disk conforms to the pitch of the spiral upon the shaft, and which corresponds to the peripheral pitch of the spiral or screw. For spacing the front and back disks apart I employ a spiral thread 34 on the shaft and preferably make this thread in sections. They may be of cast metal and are secured to the shaft by screws. The inner surface of the spiral section 34 is reduced in width, as shown in Fig. 3, to provide spaces for the reception of the opposite disk-flanges 33. In this manner the front and back disks are properly spaced and are also forced and held to the proper spiral planes and, furthermore, are securely attached to the shaft. The joints between the sheath 31 and the flanged edges of the disk are closed by solder, as shown at points 36, it being an easy matter to sweat solder into the side joints and to wipe solder into the spiral corners between the disk and the shaft. Particular stress is laid upon this feature of my invention, as I am thereby enabled to avoid the presence of uncleanly projections or cracks at the axis of the rotary member. Said member is therefore easy to clean. In building up the hollow spiral I prefer to put one of the thread-sections 34 upon the shaft and then screw the disks into place thereon. When this has been done, the next spiral section of the thread 34 is put in place and the next pair of disks then secured thereon. When the disks are thus placed, their edges are drawn together, lapped or double seamed and soldered, and the radial joints between successive disks are then closed. The drawing together of the disks operates to put them under tension, and therefore tends to nullify the effect of slack in the metal from which the disks are made. The extreme ends of the spiral are closed by drawing component disks end together or by separate pieces set between said ends, as desired. I prefer that ends of the spiral shall be substantially sharp to avoid any dashing effect upon the cream when the spiral is rotated. The shaft 12 contains two blocks, plugs, or partitions 12' 12", which prevent the direct flow of tempering fluid through the shaft. The plug 12" is placed adjacent to the last turn of the spiral, and at that end the shaft is provided with several holes 37, through which the fluid may pass from the spiral into the discharge end of the shaft. The plug 12' is distant from the front end of the spiral, and the shaft is provided with a hole or holes for each turn of the hollow spiral, whereby the tempering fluid which enters the front end of the hollow shaft will be distributed in several turns of the spiral. I have in the past made these spirals with a single set of openings between the hollow shaft and the first turn of the spiral, but now much prefer to distribute the incoming fluid between several turns of the spiral with a view to giving them, as nearly as possible, the same temperature—a temperature which is either lower or higher (according to the fluid used) than it would be in case all of the tempering fluid was compelled to traverse the whole spiral. The tempering fluid which is supplied to the hollow shaft flows through the several holes 37' into the forward parts of the hollow spiral. From this it flows through or traverses the spiral, passing spirally around the shaft until the water reaches the discharge-opening 37 at the rear end of the spiral, whence it passes into the hollow discharge end of shaft 12.

It will be noted that the wooden vat 2 is of greater length than the metal lining 4 of the cream-vat proper and that the wooden end 2" of the cream-vat proper is simply a partition in the larger wooden vat. In this way I provide a water-tank 38, so to speak, on the end of the cream-vat, this portion having its own lining 38', of galvanized iron. The rear end of the hollow shaft 12 opens into the tank 38. The top of the tank is closed by a cover 38'', and in the bottom of the tank is a metal bushing 39, having a tapered hole to receive the tapering end 40' of the overflow stand-pipe 40. This pipe may be of any desired height. I prefer that it shall extend well into the top of the tank 38 in order to provide a stand of water that will tend to keep the hollow spiral tempering device full. When it is desired to empty the tank 38, the stand-pipe 40 is removed from the bushing 39, whereupon the contents of the tank will flow out upon the floor or into a suitable drain. For circulating the contents of the tank 38 I employ a simple plunger-pump 41, preferably on the forward end of the ripener-vat. The cylinder of the pump 41 is arranged upon a bracket 41', which extends from the end of the vat. The pump is supplied through the pipe 42, leading through the bottom air-spaces 2' of the vat and terminating in a strainer pipe or section 43, lying in the bottom of the tank 38. The pipe 42 contains a check-valve 44, adjacent to the pump-cylinder. This is the admission-valve of the cylinder, while the valve 22' is the discharge-valve. The pump-plunger 45 is operated by means of an eccentric 46 on the transverse shaft 26, these parts being connected by the eccentric-strap 47 and the connecting-rod 48, the latter being pivoted in the pump-plunger 45. It will be observed that the bevel-gear 15 is of greater size than the pinion 25, and the shaft 26 therefore makes several revolutions during each revolution of the spiral tempering device in the vat. The pump is therefore operated several times for each revolution of gear 15, and this being the case the pump may be of smaller size.

49 represents the shifter or a clutch for connecting or disconnecting the shaft 26 and eccentric 46. A clutch at this point is made necessary by the fact that the pump is not always used during the rotation of the tempering device.

In addition to the pipes described as being on the front end of the vat I prefer to use a brine-return pipe 50, leading from the pump discharge to the brine-reservoir. (Not shown.) 51 is a valve in the pipe 22 to be closed when the pipe 50 is in use. I also prefer to place a check-valve 50' in the pipe 50 to prevent back-flow of brine.

The operation of my invention in detail is as follows: The vat being empty and clean, ready to receive cream, is gradually filled as the cream arrives at the creamery. As soon as the body of cream is raised into contact with the rotary spiral said spiral is set into action by throwing clutch-lever 29. Meantime the tank 38 will have been filled with cold water and ice or with brine from the pipe 21, and when the cam clutch-lever 49 is thrown in the pump 41 will be started to pump water or brine, as the case may be, from the end tank 38 through the pipes 22 and 20 into the hollow shaft of the tempering device. Here the cold water is distributed to the several turns of the spiral, and said spiral is quickly and completely filled with the cold fluid, the cold fluid being finally returned to the tank 38 through the end of the hollow shaft 12. During this time the valves 21' and 23' will be closed, while the valve 51 will be opened. The rotation of the spiral in the body of cream causes the rapid circulation of the cream in the vat and produces the desirable results hereinbefore described. When the vat has been filled with cream, the contents of the tank 38 may be withdrawn either by removing stand-pipe 40, if said contents be ice-water, or by closing the valve 51 and forcing the contents out through the brine-return pipe 50, if brine is in use. A warmer fluid then takes the place of the cold fluid for the purpose of increasing the temperature of the rotary spiral and through its agency the temperature of the cream in the vat. If ice-water has been in use during the initial emulsifying and cooling operation, I prefer to secure the increase of temperature by opening the steam-valve 23 to admix steam with the circulating water, the pump meantime continuing to operate. When instant increase of temperature is desired, the pump is stopped by throwing out the cam clutch-lever 49, and the steam-valve is opened to admit steam direct to the spiral, wherein the steam is condensed by the water remaining in said spiral. It is obvious that in place of employing the pump to circulate water from the tank 38 and also brine said pump may be preserved for water only, when in which case the pump would be stopped and the tank 38 drained before the addition of brine from the pipe 21. When the cream has been subjected to the higher temperature for sufficient time, the tempering device is cooled by shutting off the supply of steam or warmer fluid and again directing a cooler fluid into the rotary tempering device. The valves and the clutch-levers being all arranged on the same end of the vat may be operated with ease and certainty, such arrangement being calculated to prevent improper operation of the apparatus through carelessness or forgetfulness. It is further obvious that I may arrange the whole operating mechanism upon the same end with the tank 38; but I prefer to separate the tank and the operating parts, as shown in the drawings. It is further obvious that the tank 38 need not be a part of the vat, but may be removed therefrom by considerable distance, if desired. I, however, much prefer the self-contained apparatus herein illustrated. It is further obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In a cream-ripener, a suitable vat, in combination with a mechanical device therein, normally immersed in the contained cream, and adapted to cause the rapid circulation and boiling of the whole body of cream without churning the same, and a pump located upon said vat and driven with said device for circulating and tempering the fluid in said device, substantially as described.

2. In a cream-ripener, a vat, in combination with a horizontally-arranged rotary cream propelling and tempering device in said vat, a fluid-tank arranged at one end of said vat, and a pump at the other end of the vat and connected with said device and said tank, substantially as described.

3. In a cream-ripener, a vat, in combination with a rotary, hollow spiral provided in said vat, the shaft of said spiral extending through the ends of said vat, a tank upon one end of said vat to receive the discharge from the said spiral and a pump upon said vat connecting said tank and the opposite end of said spiral, substantially as described.

4. In a cream-ripener, a vat, in combination with a rotary hollow spiral provided in said vat, the shaft of said spiral extending through the ends of said vat, a tank upon one end of said vat to receive the discharge from the said spiral and a pump upon said vat, connecting said tank and the opposite end of said spiral, and means for controlling the operation of said pump, substantially as described.

5. In a cream-ripener, a vat, in combination with a hollow shaft extending through the same, a hollow spiral propeller upon said shaft within the vat, means closing the direct passage through said hollow shaft, said shaft having a plurality of openings in its receiving end, communicating with several respective turns of said hollow spiral propeller, and having openings at its rear end through which the contents of the spiral is discharged, and means for supplying tempering fluids to the said hollow shaft, substantially as and for the purpose specified.

6. In a cream-ripener, a vat, in combination with a shaft having inlet and outlet passages in its ends, a hollow spiral communicating with said passages, and composed of a thread on said shaft and a plurality of spiral disks, a fluid-tank and a pump for supplying fluid to one end of said shaft, substantially as described.

7. In a cream-ripener, a vat, and a tempering-fluid tank on the end of said vat, in combination with a rotary tempering device in said vat, means for driving said device, a pump on the end of said vat driven by said means and connected with said tank and said tempering device for circulating through the latter the contents of the former, substantially as described.

8. In a cream-ripener, a cream-vat, provided with a fluid-tempering tank, in combination with a tempering device arranged in said vat and communicating with said tank, means for supplying various fluids to said tempering device, and auxiliary fluid-supply means, comprising a pump arranged on said vat for circulating the contents of said tank, substantially as described.

9. In a cream-ripener, a vat, provided with a tempering-fluid tank, in combination with a rotary tempering device arranged in said tank, means upon the tank for driving said device, a pump driven by said means, clutches for starting and stopping said means and said pump, pump connections with said tank and said tempering device, and tank-emptying means connected with said pump, substantially as described.

10. In a tempering device for cream-ripeners, a hollow shaft, in combination with a hollow spiral arranged upon said shaft, plugs in said shaft, a longitudinal row of openings in said shaft, said openings communicating with several, respective turns of said spiral and an opening or openings in the opposite end of the shaft communicating with the end drain of said spiral, substantially as and for the purpose specified.

11. In a cream-ripener, a vat, having a tempering-fluid tank, a rotary tempering device in said vat, adapted to receive fluid at one end and discharge the same into said tank at the other, a pump on said vat, connected with the receiving end of said tempering device, a pipe leading from said pump to a strainer in said tank, pump-driving means on said vat, external fluid-supply means in communication with said pump.

In witness whereof I have hereunto set my hand, this 6th day of September, 1904, at Fort Atkinson, Jefferson county, Wisconsin, in the presence of two witnesses.

THEODORE L. VALERIUS.

Witnesses:
A. I. KYLE,
CHAS. W. FERRIS.